US006744643B2

United States Patent
Luo et al.

(10) Patent No.: US 6,744,643 B2
(45) Date of Patent: Jun. 1, 2004

(54) PUSH-PULL BOOSTER CIRCUIT WITH A PAIR OF INDUCTORS FOR COUPLING

(75) Inventors: Heng-Lian Luo, Shenzhen (CN); Su-Xue Chu, Shenzhen (CN); Jia-Bing Zou, Shenzhen (CN); Hao Wang, Shenzhen (CN)

(73) Assignee: Phoenixtec Power Co., Ltd., Taipei (TW)

( * ) Notice: Subject to any disclaimer, the term of this patent is extended or adjusted under 35 U.S.C. 154(b) by 0 days.

(21) Appl. No.: 10/236,296

(22) Filed: Sep. 6, 2002

(65) Prior Publication Data

US 2004/0047165 A1 Mar. 11, 2004

(51) Int. Cl.[7] .............................................. H02M 3/335
(52) U.S. Cl. ........................ 363/24; 363/133; 363/56.07
(58) Field of Search ............................ 363/24, 25, 133, 363/123, 56.07

(56) References Cited

U.S. PATENT DOCUMENTS

| | | | | |
|---|---|---|---|---|
| 3,970,916 A | * | 7/1976 | Kienscherf ................... 363/71 |
| 4,254,459 A | * | 3/1981 | Belson .......................... 363/24 |
| 4,578,744 A | * | 3/1986 | Antula .......................... 363/37 |
| 4,675,797 A | * | 6/1987 | Vinciarelli ................. 363/21.04 |
| 4,706,177 A | * | 11/1987 | Josephson .................... 363/24 |
| 5,790,391 A | * | 8/1998 | Stich et al. ................... 363/24 |
| 6,121,756 A | * | 9/2000 | Johnson et al. ............. 320/140 |

* cited by examiner

*Primary Examiner*—Shawn Riley
(74) *Attorney, Agent, or Firm*—Thomas, Kayden, Horstemeyer & Risley, LLP

(57) ABSTRACT

A modified push-pull booster circuit is proposed, wherein two alternately switching transistors are disposed on the primary winding of a transformer, and a bridge rectifier and a charging circuit are disposed on the secondary winding; wherein the bridge rectifier has a pair of inductors with inductive coupling installed on the first half and second half of the circuit. The push-pull circuit uses series inductance to step up the bus voltage, and, because of the degaussing effect when current is induced on the inductors, the inductance of the inductor can be decreased even without using snubber circuit, thus decreasing the peak voltage of the bridge rectifier, and balancing the magnitude of current flow in the secondary winding. By reducing the turn ratio on the transformer windings, the operating efficiency of the booster circuit can be considerably improved.

12 Claims, 2 Drawing Sheets

PUSH-PULL BOOSTER CIRCUIT WITH A PAIR OF INDUCTORS FOR COUPLING

BACKGROUND OF THE INVENTION

1. Field of the Invention

The present invention relates to a modified push-pull booster circuit, in particular to a modified circuit that can improve the operating efficiency of a transformer by reducing the turn ratio in the transformer and simplifying the circuit, which is capable of cutting down the production cost considerably.

2. Description of Related Arts

Though switching power supplies are vital for electronic products, the efficiency of a dc booster circuit is just as important to a switching power supply. With reference to FIG. 4, a conventional push-pull booster circuit for an ac/dc transformer is composed of a pair of alternately switching transistors (Q1, Q2) that allow electrical energy to be transferred from the primary winding to the secondary winding in a transformer. Since the current in the primary and secondary windings of a transformer (70) flows in opposite directions, degaussing takes place each time the two transistors (Q1, Q2) in the windings of the transformer (70) break over. The secondary winding of the transformer (70) is coupled to a bridge rectifier (71) so the output from the transformer can be inverted by full wave rectification. The rectified current is then passed to the charging circuit (72) formed by two capacitors (C1, C2) that generate positive and negative bus voltages for a load circuit.

Since the capacitance in the capacitors (C1, C2) is usually quite high, the peak current of the bus charging circuit can fluctuate widely. Adding inductors (L1, L2) on the positive and negative electrodes of the charging circuit (72) is necessary. The main purpose of adding the inductors (L1, L2) is to limit the rise in current in the secondary winding of the transformer (70), and to maintain a continuous flow even during cut off.

However, when the current abruptly changes direction, the inductors (L1, L2) in series generate a peak voltage, which increases the voltage stress on the rectifying diodes (D1, D2, D3, D4) in the bridge rectifier (71). Therefore, a snubber circuit (73) is normally added between the inductors (L1, L2). The snubber circuit (73) consists of two subcircuits with one subcircuit connected to each side of the bridge rectifier. Each subcircuit of the snubber circuit (73) is composed of a diode (D5, D6), a capacitor (C3, C4) and a resistor (R1, R2). Consequently, the peak voltage through the bridge rectifier (71) is reduced, which decreases the voltage stress on the rectifying diodes (D1, D2, D3, D4) and permits the use of components made to less stringent specifications.

The foregoing modification to the booster circuit uses a snubber circuit (73) that adds components and raises the cost of production. Also, the inherent power loss in the snubber circuit (73) will decrease the overall efficiency of the circuit, and the series inductors (L1, L2) will reflect the voltage when the current changes direction suddenly, thus partially offsetting the boosted voltage of the push-pull transformer (70). To offset the reflected voltage, the turns on the secondary winding of the transformer (70) must be increased to obtain the design bus voltage. However, the increased number of turns on the secondary winding has a negative effect on production costs, manufacturing complexity and operating efficiency of the transformer (70) as a whole.

Although good reasons exist for using inductors in series, a better solution is presented in the present invention.

SUMMARY OF THE INVENTION

The main objective of the present invention is to provide a modified push-pull booster circuit capable of simplifying the circuit design, lowering the production cost and improving the operating efficiency of the transformer.

The push-pull booster circuit in accordance with the present invention mainly includes two switch transistors; a bridge rectifier and a charging circuit. The two alternately switching transistors are connected to the primary winding of the transformer. The bridge rectifier and the charging circuit are connected sequentially to the secondary winding, and a pair of inductors with inductive coupling is connected between the bridge rectifier and the charging circuit, or between the secondary winding of the transformer and the bridge rectifier.

Since these two inductors are in series configuration, current passing through produces a degaussing effect, equivalent to leakage inductance. When a current suddenly increases through the switch transistors in the primary winding of the transformer or the secondary winding of the transformer, the induced voltage in both inductors will cancel each other, thereby preventing a peak voltage on the rectifying diodes of the bridge rectifier. Also, when current is induced in any one of the inductors, an induced voltage will appear on the other winding due to the inductive coupling, which will cause recharging of the capacitor and boosting the bus voltage.

The inductively coupled inductors are implemented by a second transformer with the same number of turns on the primary and secondary windings.

The features and structure of the present invention will be more clearly understood when taken in conjunction with the accompanying figures.

DETAILED DESCRIPTION OF THE PREFERRED EMBODIMENT

Figure 1:
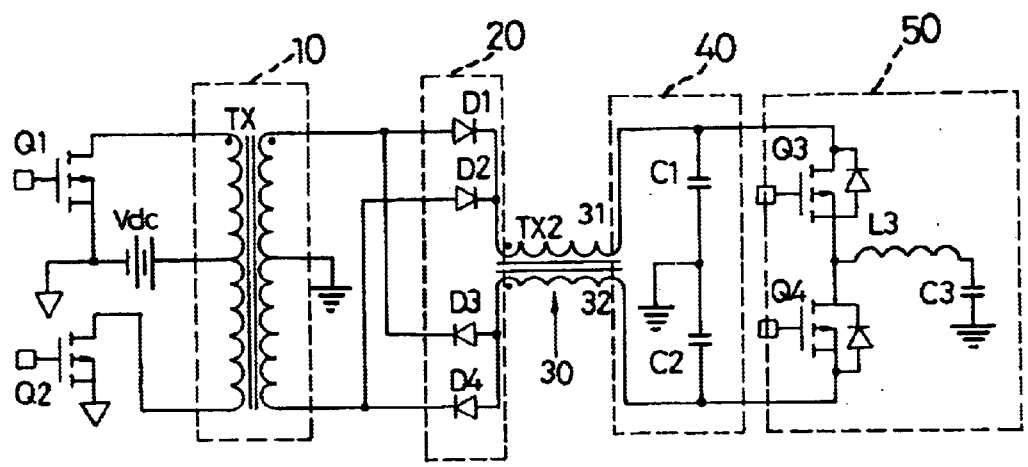
FIG. 1 is a circuit diagram of a preferred embodiment of a push-pull booster circuit in accordance with the present invention.
Figure 2:
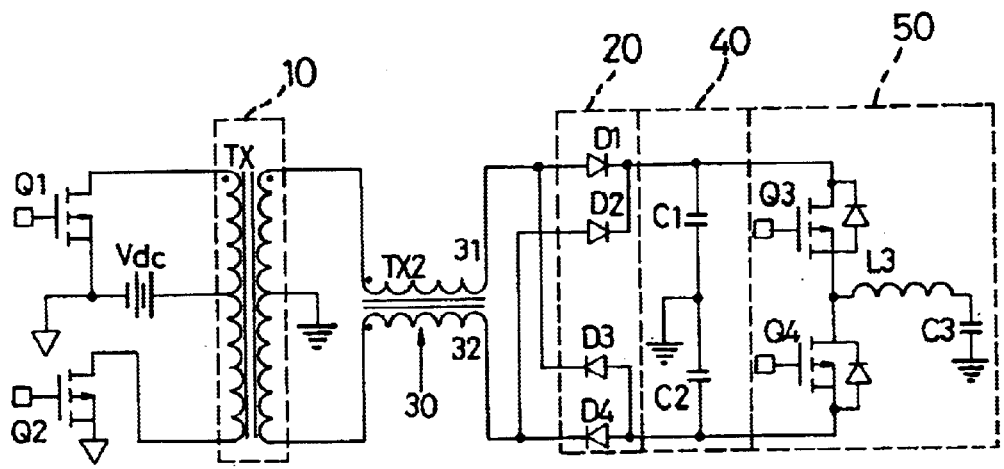
FIG. 2 is a circuit diagram of another preferred embodiment of the push-pull booster circuit in accordance with the present invention.

With reference to FIGS. 1 and 2, a modified push-pull circuit in accordance with the present invention comprises a transformer (10), a bridge rectifier (20), a pair of coupled inductors (30), a charging circuit (40) and a dc/ac inverter (50). The transformer (10) has a primary winding and a secondary winding. The primary winding is connected conventionally to a dc voltage source (Vdc) and two alternately switching transistors (Q1, Q2) are connected to the primary winding to alternatively control the dc voltage to the primary winding of the transformer (10).

With reference to FIG. 1, the bridge rectifier (20) is connected directly to the secondary winding of the transformer (10) in a first embodiment of the push-pull circuit in accordance with the present invention. The output of which is connected to a charging circuit (40) through two series inductors (31) (32).

The charging circuit (40) is composed of two bus charge capacitors C1 and C2, each of which has one end connected to each other, and the other end respectively connected to a dc/ac inverter (50).

The dc/ac inverter (50) is composed of two alternately switching power transistors (Q3, Q4), a low-pass filter formed by inductor L3 and capacitor C3. The two power transistors (Q3, Q4) are interconnected through adjacent source and drain electrodes, and further connected to inductor L3, whilst the source and drain on the opposite ends are connected to the charging circuit (40).

The series inductors (31) (32) mentioned above are formed on a second transformer (30), having identical turn ratio on the primary winding and the secondary winding, whereby degaussing effect is created each time current flows through.

In the push-pull circuit mentioned above, dc—dc portion is implemented with push-pull configuration. The initial Vdc passes through switch transistors (Q1, Q2), the primary winding of the push-pull transformer (10), and then return to the negative electrode of Vdc. By means of inductive coupling of the primary winding and secondary winding of the transformer (10), and appropriate adjustment of the turn ratio on the primary winding and secondary winding of the transformer (10), high frequency ac voltage can be produced on the secondary winding, and further through full wave rectification by a bridge rectifier (20), the current recharges two capacitors (C1, C2) in the charging circuit (40). A relatively stable bus voltage can be obtained on the positive and negative electrodes, which are eventually output in the form of positive sine wave through the two power transistors (Q3, Q4) in the dc/ac inverter unit (50) and the low-pass filter formed by L3 and C3.

In order to reduce the peak voltage and changes in bus current, and to avoid the negative effects associated with series inductors, it is necessary to connect the two inductors in the conventional charging circuit by means of inductive coupling. That means the two inductors have to be replaced by a second transformer (30) with the same turn ratio on the primary winding and the secondary winding and using an appropriate winding technique so as to make the magnetizing effect on the two windings, being used as inductors (31) (32), offset each other when current is induced.

During the normal operation of the push-pull circuit, the magnitude of current flow changes constantly. In the conventional booster circuit, Changes in current causes a certain amount of voltage drop across the two inductors (L1, L2) of the transformer (70), thereby partially offsetting the voltage boosting effect. According to the present invention, by inductive coupling of two inductors (31) (32), the voltage-offset effect does not occur on the transformer (10), and the induced current can be used for bus charging. Since the modified push pull circuit is accomplished with smaller turn ratio on the transformer (10) windings, thus simplifying the design of the push-pull transformer and improving the operating efficiency.

FIG. 2 shows the circuit diagram of another preferred embodiment of the invention basing on the same theory. The circuit design is basically identical to the example previously illustrated, but the two inductors with inductive coupling (31) (32) this time are disposed on the first half of the bridge rectifier (20) producing the same results.

The operation of the push-pull circuit is now further explained in conjunction with the drawings.

Figure 3:
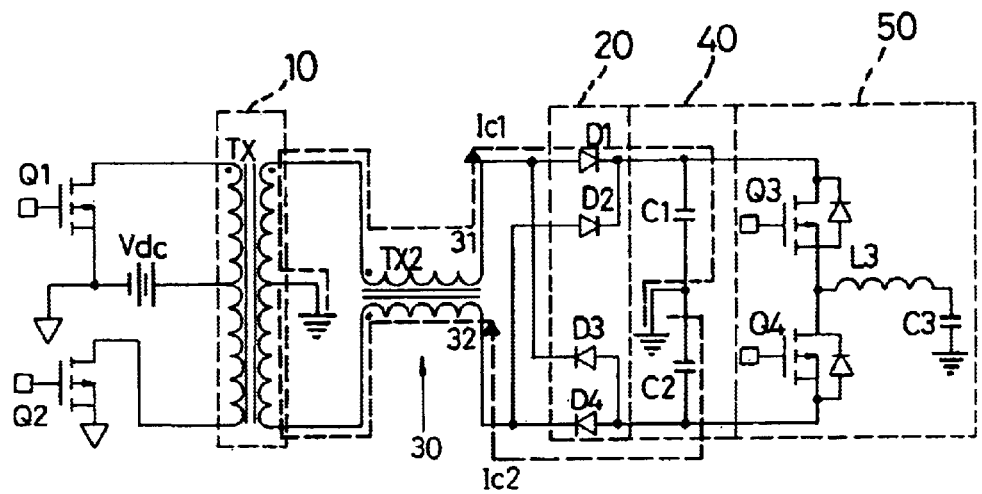
FIG. 3 is the circuit diagram in FIG. 2 with current indicator.
Figure 4:
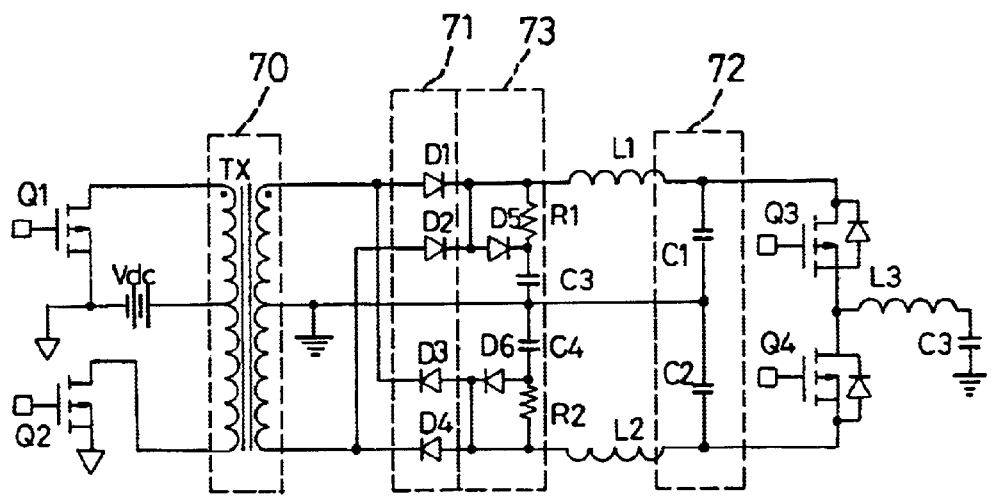
FIG. 4 is a circuit diagram of a conventional push-pull booster circuit.

With reference to FIG. 3, the arrow passing through the primary winding, i.e. inductor (31), of the second transformer (30) is used to represent the positive bus charging current Ic1 when the switch transistor Q2 breaks over, and the arrow passing through the secondary winding, i.e. inductor (32), of the second transformer (30) is used to represent negative bus charging current Ic2. Since the positive and negative bus capacitors do not have the same voltage level, the magnitude of current to be generated on the ground line corresponds to the difference between the positive and negative bus charging current from the capacitors. If the output from the dc/ac inverter (50) is currently in the positive half cycle, then the positive charging capacitor C1 supplies current, so the current flow in Ic1 is greater than Ic2. If the second transformer (30) is not applied, then the two charging capacitors (C1, C2) are fully independent from the other one. But under the present invention, with the application of the second transformer (30), when the switch transistor Q2 breaks over, even though the current flow in Ic1 and Ic2 are not the same, but the inductance produced on the windings of the second transformer tends to cancel each other out, which is equivalent to leakage inductance. When the switch transistor Q2 is cut off, the peak voltage on the bridge rectifier (20) is correspondingly decreased. In the conventional booster circuit, since current Ic1 and Ic2 do not influence each other, the voltage on the supply current from the bus charging circuit to the dc/ac inverter is so low, there is no recharging for the charging capacitor. But with the addition of the second transformer (30), the difference in current flow between Ic1 and Ic2 is detected by the second transformer (30) and reflected by potential difference on the opposite side. As shown in the diagram, the second transformer (30) is coupled on the first transformer (10) in cascade, thus allowing for the charging of capacitor C2, raising the voltage higher than previously.

The ideal operating condition for the present invention is in low bus voltage, since the power loss in dc/ac conversion is correspondingly lower, and the push-pull booster circuit operates in the continuous mode operation with less power loss and voltage stress. Usually, in the push-pull booster circuit, if the turn ratio on the transformer windings are cut down to decrease the bus voltage, the battery voltage may drop below a certain level (for example, 330V) under which distortion in output waves will cut short the discharging time. But in the present invention, with the introduction of two inductors with inductive coupling, the push-pull circuit is capable of increasing the bus voltage, even when the turn ratio of transformer windings is reduced, the battery voltage is decreased correspondingly, the decrease in bus voltage is much less, thus the discharging time can be prolonged.

It is clear the operating efficiency can be significantly improved in the condition of low battery voltage, whereas the operating efficiency decreases in high battery voltage condition. Therefore, in the circuit design, the turn ratio of the transformer winding has to be kept to a minimum, cutting down the duration of high battery voltage in bus charging. For example, when the battery voltage is 13.2V, it is necessary to control the output bandwidth from the push-pull circuit to control the bus voltage in the 380V level. During this time the push-pull circuit is in non-continuous mode, operating with lower efficiency. But if the battery voltage is decreased, the output bandwidth conversely is becoming larger, until the push-pull circuit is engaged in continuous mode. During this time the bus voltage will decrease in step with the battery voltage (not a linear relationship), thus the efficiency of the push-pull circuit can be increased.

According to the invention, when the battery voltage is dropped too low, the inductors with inductive coupling is capable of boosting the bus voltage. For example, when the battery voltage is dropped to about 11V, using the same transformer, when the bus voltage for the conventional booster circuit will fail to maintain 330V level, but the push-pull circuit of the present invention still can maintain a bus voltage above 330V level, until the battery voltage drops below 10V. During this time the push-pull circuit can operate in continuous mode for longer period thus increasing the overall efficiency.

It is clear that the turn ratio of transformer winding is a critical factor in the circuit design of the present invention, which determines the operation time of the push-pull circuit in the continuous mode whilst keeping the non-continuous mode time to a minimum level.

The modified push-pull circuit in accordance with the present invention is advantageous, in that:

1. Superior operating efficiency and low production cost: since the bridge rectifier in the push-pull circuit is installed with two inductors with inductive coupling respectively in the first half and second half of the circuit, such that inductance on the bus charging circuit can be kept low not to cause spikes in the rectifying diodes in the bridge rectifier, obviating the need of a snubber circuit.
2. Lower peak voltage: The introduction of two inductors with inductive coupling on the charging circuit causes the positive and negative bus charging current to be gradually adjusted to the same level.
3. Reduced turn ratio on the transformer windings: Since the two inductors with inductive coupling are formed on the same transformer, the bus voltage can be raised by series inductance.

The foregoing description of the preferred embodiments of the present invention is intended to be illustrative only and, under no circumstances, should the scope of the present invention be so restricted.

What is claimed is:

1. A push-pull booster circuit having a transformer with a primary winding and a secondary winding, wherein the primary winding of the transformer connects to a dc source and two alternately switching transistors are disposed on the primary winding; and the secondary winding connects to a bridge rectifier, a charging circuit, and a dc/ac inverter;

wherein the push-pull booster circuit is characterized by two inductors with inductive coupling disposed in between said bridge rectifier and said charging circuit;

wherein the charging circuit is formed by a pair of capacitors.

2. The push-pull booster circuit as claimed in claim 1, wherein the pair of inductors with inductive coupling is formed on a second transformer.

3. The push-pull booster circuit as claimed in claim 2, wherein the turn ratio on the primary and secondary windings of the second transformer are equal.

4. The push-pull booster circuit as claimed in claim 1, wherein the dc/ac inverter is formed by two alternately switching power transistors and a low-pass filter composed of inductors and capacitors.

5. The push-pull booster circuit as claimed in claim 4, wherein one ends of the two alternately switching power transistors are connected to each other through adjacent source and drain electrodes, and the opposite ends are respectively connected to the charging circuit.

6. The modified push-pull booster circuit as claimed in claim 1, wherein the two capacitors in the charging circuit each have one end connected to each other, and the other end connected to a power transistor.

7. A push-pull booster circuit having a transformer with a primary winding and a secondary winding, wherein the primary winding on a of the transformer connects to a dc source and two alternately switching transistors are disposed on the primary winding, and the secondary winding connects to a bridge rectifier, a charging circuit, and a dc/ac inverter;

wherein the push-pull circuit is characterized by two inductors with inductive coupling disposed in between said bridge rectifier and said secondary winding of the transformer circuit;

wherein the charging circuit is formed by a pair of capacitors.

8. The push-pull booster circuit as claimed in claim 2, wherein the pair of inductors with inductive coupling is actually formed on a second transformer.

9. The push-pull booster circuit as claimed in claim 8, wherein the turn ratio on the primary and secondary windings of the second transformer are equal.

10. The push-pull booster circuit as claimed in claim 7, wherein the dc/ac inverter is formed by two alternately switching power transistors and a low-pass filter composed of inductors and capacitors.

11. The push-pull booster circuit as claimed in claim 10, wherein one ends of the two alternately switching power transistors are connected to each other through adjacent source and drain electrodes, and the opposite ends are respectively connected to the charging circuit.

12. The modified push-pull booster circuit as claimed in claim 7, wherein the two capacitors in the charging circuit each have one end connected to each other, whilst the other end connected to a power transistor.

* * * * *